(12) United States Patent
Chen et al.

(10) Patent No.: US 12,309,404 B2
(45) Date of Patent: May 20, 2025

(54) CONTEXTUAL VIDEO COMPRESSION FRAMEWORK WITH SPATIAL-TEMPORAL CROSS-COVARIANCE TRANSFORMERS

(71) Applicants: Disney Enterprises, Inc., Burbank, CA (US); ETH Zürich (Eidgenössische Technische Hochschule Zürich), Zürich (CH)

(72) Inventors: Zhenghao Chen, Sydney (AU); Roberto Gerson De Albuquerque Azevedo, Zurich (CH); Christopher Richard Schroers, Uster (CH); Yang Zhang, Dubendorf (CH); Lucas Relic, Zurich (CH)

(73) Assignees: Disney Enterprises, Inc., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 40 days.

(21) Appl. No.: 18/349,076

(22) Filed: Jul. 7, 2023

(65) Prior Publication Data

US 2024/0305801 A1    Sep. 12, 2024

Related U.S. Application Data

(60) Provisional application No. 63/488,944, filed on Mar. 7, 2023.

(51) Int. Cl.
| | |
|---|---|
| *H04N 7/12* | (2006.01) |
| *H04N 19/172* | (2014.01) |
| *H04N 19/42* | (2014.01) |
| *H04N 19/91* | (2014.01) |

(52) U.S. Cl.
CPC ......... *H04N 19/42* (2014.11); *H04N 19/172* (2014.11); *H04N 19/91* (2014.11)

(58) Field of Classification Search
CPC ....... H04N 19/42; H04N 19/172; H04N 19/91
See application file for complete search history.

(56) References Cited

U.S. PATENT DOCUMENTS

| | | | | |
|---|---|---|---|---|
| 11,310,509 | B2* | 4/2022 | Topiwala | H04N 21/23418 |
| 11,582,485 | B1* | 2/2023 | Cherian | G06V 10/86 |
| 2017/0223308 | A1* | 8/2017 | Chen | G06T 7/215 |
| 2022/0014807 | A1* | 1/2022 | Lin | G06V 20/635 |

(Continued)

OTHER PUBLICATIONS

Abdelaziz Djelouah, et al., "Neural Inter-Frame Compression for Video Coding," Computer Vision Foundation, 9 pages, 2019.

(Continued)

*Primary Examiner* — Gims S Philippe
(74) *Attorney, Agent, or Firm* — Kwan & Olynick LLP (57) ABSTRACT

In some embodiments, a system includes a first component to extract temporal features from a current frame being coded and a previous frame of a video. A second component uses a first transformer to fuse spatial features from the current frame with the temporal features to generate spatio-temporal features as first output. A third component uses a second transformer to perform entropy coding using the first output and at least a portion of the temporal features to generate a second output. A fourth component uses a third transformer to reconstruct the current frame based on the first output that is processed using the second output and the temporal features.

20 Claims, 7 Drawing Sheets

(56) References Cited

U.S. PATENT DOCUMENTS

| | | | |
|---|---|---|---|
| 2022/0078488 A1* | 3/2022 | Leleannec | H04N 19/105 |
| 2022/0092645 A1* | 3/2022 | Pan | G06V 20/00 |
| 2023/0090941 A1* | 3/2023 | Li | G06V 20/40 |
| | | | 382/157 |
| 2024/0054757 A1* | 2/2024 | Guo | G06V 20/41 |
| 2024/0107088 A1* | 3/2024 | Kalva | H04N 21/4402 |
| 2024/0167852 A1* | 5/2024 | Kim | G06N 20/00 |

OTHER PUBLICATIONS

Adam Paszke, "PyTorch: An Imperative Style, High-PerformanceDeep Learning Library," 33rd Conference on Neural Information Processing Systems (NeurIPS 2019), 12 pages.

Alaaeldin El-Nouby, et al., "XCiT: Cross-Covariance Image Transformers," arXiv:2106.09681v2 [cs.CV] 18 pages, Jun. 2021.

Amirhossein Habibian, et al., "Video Compression With Rate-Distortion Autoencoders," Computer Vision Foundation, 10 pages, 2019.

An End-to-End Learning Framework for Video Compression. (n.d.). IEEE Xplore. https://ieeexplore.IEEE.org/document/9072487.

Anurag Ranjan, "Optical Flow Estimation using a Spatial Pyramid Network," arXiv:1611.00850 [cs.CV], Submitted on Nov. 3, 2016, 10 pages.

Benjamin Bross, et al., "Overview of the Versatile Video Coding (VVC) Standard and Its Applications," IEEE Transactions on Circuits and Systems for Video Technology, vol. 31, No. 10, 29 pages, Oct. 2021.

David Minnen, "Joint Autoregressive and Hierarchical Priors for Learned Image Compression," 32nd Conference on Neural Information Processing Systems (NeurIPS 2018), 10 pages.

David S. Taubman, et al., "JPEG2000: Standard for Interactive Imaging," Roceedings of the IEEE, vol. 90, No. 8, Aug. 2002, 22 pages.

Eirikur Agustsson, et al., "Scale-space flow for end-to-end optimized video compression," Computer Vision Foundation, 2020, 10 pages.

Fabian Mentzer, "Practical Full Resolution Learned Lossless Image Compression," Computer Vision Foundation, 2018, 10 pages.

Fabian Mentzer, "VCT: A Video Compression Transformer," 36th Conference on Neural Information Processing Systems (NeurIPS 2022), 13 pages.

Gary J. Sullivan, "Overview of the High Efficiency Video Coding(HEVC) Standard," IEEE Transactions on Circuits and Systems for Video Technology, vol. 22, No. 12, Dec. 2012, 20 pages.

Gregory K. Wallace, "The JPEG Still Picture Compression Standard," IEEE Transactions on Consumer Electronics, vol. 38, No. 1, Feb. 1992, 17 pages.

Guo Lu, "An End-to-End Learning Framework for Video Compression," IEEE Transactions on Pattern Analysis and Machine Intelligence, 2020, 17 pages.

Guo Lu, "Content Adaptive and Error Propagation Aware Deep Video Compression," arXiv:2003.11282 [eess.IV], [Submitted on Mar. 25, 2020], 17 pages.

Guo Lu, "DVC: An End-to-end Deep Video Compression Framework," Computer Vision Foundation, 10 pages, 2018.

Haiqiang Wang, "MCL-JCV: a JND-Based H.264/AVC Video Quality Assessment Dataset," IEEE International Conference on Image Processing (ICIP), 2016, 5 pages.

https://bellard.org/bpg/, printed from website on on Jul. 7, 2023, 2 pages.

https://hevc.hhi.fraunhofer.de/HM-doc/, printed from website on on Jul. 6, 2023, 2 pages.

https://jvet.hhi.fraunhofer.de/, printed from website on Jul. 6, 2023, 3 pages.

https://pytorch.org/docs/stable/generated/torch.nn.PixelShuffle.html, printed from website on Jul. 7, 2023, 2 pages.

https://ultravideo.fi/, printed from website on on Jul. 7, 2023, 3 pages.

Jiahao Li, "Deep Contextual Video Compression," Microsoft Research Asia, 35th Conference on Neural Information Processing Systems (NeurIPS 2021), 12 pages.

Jiahao Li, "Hybrid Spatial-Temporal Entropy Modelling for Neural Video Compression," rXiv:2207.05894v1 [eess.IV] Jul. 13, 2022, 17 pages.

Jianping Lin, "M-LVC: Multiple Frames Prediction for Learned Video Compression," Computer Vision Foundation, 2020, 9 pages.

Jingyun Liang, et al., "Recurrent Video Restoration Transformer with Guided Deformable Attention," 36th Conference on Neural Information Processing Systems (NeurIPS 2022), 16 pages.

Jingyun Liang, et al., "SwinIR: Image Restoration Using Swin Transformer," Computer Vision Foundation, 12 pages, 2021.

Jingyun Liang, et al., "VRT: A Video Restoration Transformer," arXiv:2201.12288v2 [cs.CV] Jun. 15, 2022, 14 pages.

Johannes Ballé, et al., "Variational Image Compressionwith a Scale Hyperprior," Xiv:1802.01436v2 [eess.IV] 1, 23 pages, May 2018.

Jun Han, et al., Deep Generative Video Compression, "Deep generative video compression," In Advances in Neural Information Processing Systems, 9287-9298 (2019).

Jun Han, et al., "Deep Probabilistic Video Compression," arXiv preprint arXiv: 1810.02845 (2018), 15 pages.

Ming Lu, "Transformer-based Image Compression," 2022 Data Compression Conference (DCC), 1 page.

Mingyang Song, "TempFormer: Temporally Consistent Transformer for Video Denoising," ECCV 2022: Computer Vision—ECCV 2022, 16 pages.

Ren Yang, "Learning for Video Compression with Hierarchical Quality and Recurrent Enhancement," Computer Vision Foundation, 2020, 10 pages.

Syed Waqas Zamir, "Restormer: Efficient Transformer for High-Resolution Image Restoration," Computer Vision Foundation, arXiv:2111.09881 [cs.CV], Submitted on Nov. 18, 2021, 12 pages.

Tianfan Xue, "Video Enhancement with Task-Oriented Flow," International Journal of Computer Vision (IJCV), 127 (8):1106-1125, 2019.

Xihua Sheng, "Temporal Context Mining for Learned VideoCompression," rXiv:2111.13850v2 [cs.CV] Jan. 30, 2023, 13 pages.

Yichen Qian, "Entroformer: a Transformer-Based Entropy Model for Learned Image Compression," Published as a conference paper at ICLR 2022, 15 pages.

Yinhao Zhu, et al., "Transformer-based Transform Coding," Published as a conference paper at ICLR 2022, 35 pages.

Ze Liu, "Swin Transformer: Hierarchical Vision Transformer using Shifted Windows," Computer Vision Foundation, 2021, 11 pages.

Zhengxue Cheng, et al., "Learned Image Compression with Discretized Gaussian Mixture Likelihoods and Attention Modules," Computer Vision Foundation, 10 pages, 2020.

Zhihao Hu, "FVC: A New Framework towards Deep Video Compression in Feature Space," Computer Vision Foundation, 10 pages, 2021.

Zhihao Hu, et al., "Coarse-to-fine Deep Video Coding with Hyperprior-guided Mode Prediction," Computer Vision Foundation, 10 pages, 2022.

Zhihao Hu, et al., Improving Deep Video Compression by Resolution-adaptive Flow Coding, arXiv:2009.05982 [cs. CV], 16 pages, submitted Sep. 13, 2020.

* cited by examiner

CONTEXTUAL VIDEO COMPRESSION FRAMEWORK WITH SPATIAL-TEMPORAL CROSS-COVARIANCE TRANSFORMERS

CROSS REFERENCE TO RELATED APPLICATIONS

Pursuant to 35 U.S.C. § 119(e), this application is entitled to and claims the benefit of the filing date of U.S. Provisional App. No. 63/488,944 filed Mar. 7, 2023, entitled "CONTEXTUAL VIDEO COMPRESSION FRAMEWORK WITH SPATIAL-TEMPORAL CROSS-COVARIANCE TRANSFORMERS", the content of which is incorporated herein by reference in its entirety for all purposes.

BACKGROUND

Video compression reduces the amount of data that is stored or transmitted for videos. Achieving an efficient reduction in data is important considering the increasing demand for storing and transmitting videos. Video compression may attempt to exploit spatial redundancy between pixels in the same video frame or temporal redundancy between pixels in multiple video frames. Some video compression methods may focus on improving either temporal information or spatial information separately. Then, these methods may combine spatial information and temporal information using simple operations, such as concatenation or subtraction. However, these operations may only partially exploit the spatial-temporal redundancies.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Described herein are techniques for a video coding system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

In some embodiments, a system may perform video compression using a neural video compression (NVC) process that uses end-to-end optimized neural components based on a spatio-temporal-aware cross-covariance attention. The system may aggregate individual features, such as two dimensional (2D)-based individual features for spatial information and temporal information, into a three dimensional (3D)-based joint spatio-temporal feature. A feature may be characteristics that are extracted from a video frame or frames and be used to represent spatial information, temporal information, and/or spatio-temporal information. The 3D feature includes an additional temporal dimension compared to the 2D spatial feature. The system may use a transformer to analyze spatial information and temporal information together to mix the spatial-temporal information locally. Then, the system may apply an attention mechanism across the entire feature channel to produce a global spatio-temporal-aware cross-covariance attention matrix that may represent relationships between the spatial and temporal information features. The cross-covariance attention matrix may be used to calculate spatio-temporal-aware cross-covariance attention weights. The attention weights are then applied to emphasize more relevant spatio-temporal correlations and deemphasize less relevant spatio-temporal correlations. The transformer may directly compute cross-covariance attention on features without disintegrating the features into several parts or tokens. Such a design not only allows the transformer to model global spatio-temporal correlations but also has a linear complexity, which makes the computation efficient because the computational cost grows linearly with the input sequence length.

The transformer may be integrated into multiple coding components, such as feature extraction, frame reconstruction, and entropy modeling. For example, the transformer may be used to extract features in a feature decoder, to perform entropy encoding using an entropy model, and to reconstruct the frame using a feature decoder. The use of the spatio-temporal-aware cross-covariance attention may exploit spatial information and temporal information in different coding components, which results in significantly improved video compression performance.

System

Figure 1:
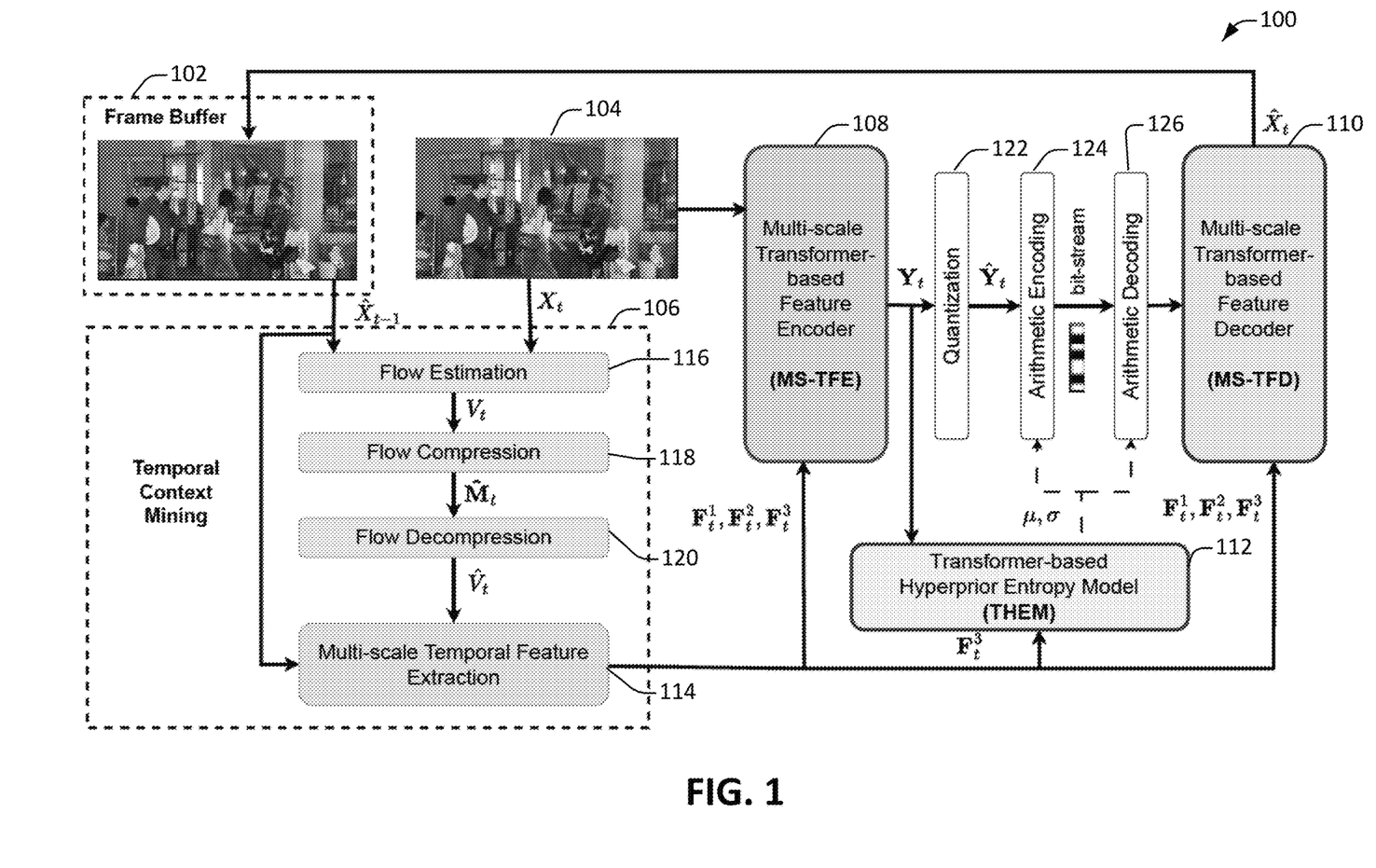
FIG. 1 depicts a simplified system for performing neural video compression according to some embodiments.

FIG. 1 depicts a simplified system 100 for performing neural video compression according to some embodiments. System 100 includes a temporal context mining process 106, a multi-scale transformer-based feature encoder (MS-TFE) 108 (referred hereinafter as feature encoder 108), a multi-scale transformer-based feature decoder (MS-TFD) 110 (referred hereinafter as feature decoder 110), and a transformer-based hyperprior entropy model (THEM) 112 (referred hereinafter as entropy model 112). System 100 may compress a current frame $X_t$ at 104 of a video sequence $X=\{X1, X2, \ldots, Xt-1, Xt, \ldots\}$ to obtain the reconstructed frame $\hat{X}_t$, where the subscript t represents the current time step t. The process involves temporal context mining, spatial-temporal feature extraction by feature encoder 108, entropy coding by entropy model 112, and frame reconstruction by feature decoder 110. As will be discussed below, a spatio-temporal cross-covariance transformer may be used in feature encoder 108, feature decoder 110, and entropy model 112.

Temporal context mining process 106 receives a reconstructed reference frame $\hat{X}_{t-1}$ from a frame buffer 102 and a current coding frame $X_t$ at 104. The reconstructed frame $\hat{X}_{t-1}$ may be one or more previous frames to the currently being coded frame $X_t$. Temporal context mining process 106 may extract temporal features based on the previous frame(s) and the current frame.

In some embodiments, a flow estimation process at 116 may receive one most recent previous reconstructed frame and the current frame. Raw optical flow $V_t$ may be estimated between the reconstructed reference frame $\hat{X}_{t-1}$ and the current coding frame $X_t$. The raw optical flow may estimate motion between the frames, such as uncompressed optical flow data of pixel-level motion information between the reconstructed reference frame and the current coding frame. The flow data may provide an estimation of motion between the frames. A flow compression process 118 may compress the raw optical flow to quantized motion features $\hat{M}_t$. The quantized motion features $\hat{M}_t$ may be a representation of the raw optical flow in a compressed form to reduce the number of bits. Then, a flow decompression process 120 may decompress the quantized motion features to a reconstructed flow $\hat{V}_t$. A multi-scale temporal feature extraction process 114 receives the reconstructed flow. Then, process 114 may extract temporal context information, such as in multiple scales (e.g., three scales of temporal context information $F_t^1$, $F_t^2$, $F_t^3$), which describe motion between the frames. The scales of temporal context information may be different levels of temporal context, such as a smallest temporal context $F_t^3$, a medium temporal context $F_t^2$, and a largest temporal context $F_t^1$. The temporal context may be at different scales based on different durations of previous frames that are used to determine the temporal context, where the smallest scale uses more recent frames to the current frame to the largest scale that uses the furthest away frames from the current frame. Although different scales of temporal features are described, a single scale may be used.

After extracting temporal features, feature encoder 108 may extract spatial information from the current frame $X_t$ and fuse the spatial information with previously produced multi-scale temporal features $F_t^1$, $F_t^2$, $F_t^3$. At each scale, i, the spatial features and temporal features are combined to produce latent features $Y_t$ with the spatial-temporal information. Latent features may be hidden features that may be derived and capture meaningful patterns or characteristics of the spatial-temporal information. To produce the latent features, feature encoder 108 may concatenate the largest scale temporal features $F_t^1$ with the spatial information from the current frame. Then, feature encoder 108 may process the combined features, such as using two-dimensional (2D) convolutional operations. Feature encoder 108 may subsequently fuse the medium scale $F_t^2$ features and smallest scale $F_t^3$ features using spatio-temporal-aware cross-covariance attention. This process will be described in more detail below in FIG. 3.

The latent features $Y_t$ may be quantized using quantization process 122 to $\hat{Y}_L$. To losslessly encode and decode the produced quantized latent features $\hat{Y}_t$, an arithmetic encoding process 124 converts the quantized latent features $\hat{Y}_t$ to a bitstream, which may be part of the encoded bitstream of the video. Then, an arithmetic decoding process 126 may decode the bitstream. The decoded bitstream may be used to reconstruct the current frame $X_t$.

To reduce the bitrate, entropy model 112 may be used to estimate the distribution of the quantized latent features $Y_t$, which improves cross entropy coding. Entropy coding may encode symbols based on their probabilities. Entropy model 112 may perform entropy coding using the latent features $Y_t$ and extracted features from extraction process 114. In some embodiments, a smallest scale temporal features $F_t^3$ is used in the entropy coding, but other scales may be used.

Entropy model 112 may estimate the probability distribution of the quantized latent features $\hat{Y}_t$ for bitrate saving. As will be discussed in more detail below, entropy model 112 may use the spatio-temporal cross-covariance transformer to fuse the temporal features $F_t^3$ and spatio-temporal features from the quantized latent features $Y_t$. This may be an improvement over simple concatenation of the two features. The process of entropy coding using entropy model 112 will be described in more detail below in FIG. 4. The output of entropy model 112 may be a distribution, such as the mean and deviation, of the temporal features $F_t^3$ and the quantized latent features $Y_t$. Arithmetic encoding process 124 and arithmetic decoding process 126 may use the distribution to generate the encoded bitstream and decode the bitstream, respectfully.

Frame reconstruction may be performed by feature decoder 110. The frame reconstruction process may generate a reconstructed frame $\hat{X}_t$ from the quantized latent features $\hat{Y}_t$. Feature decoder 110 may also receive the multi-scale features $F_t^1, F_t^2, F_t^3$ from multi-scale temporal feature attraction process 114. To better leverage the spatial information and temporal information, a spatio-temporal cross-covariance transformer may be used in the reconstruction. The transformer may be used to fuse the quantized latent features $\hat{Y}_t$ and the multi-scale temporal features $F_t^1$, $F_t^2$, $F_t^3$ to generate the reconstructed frame $\hat{X}_t$. This process will be described in more detail in FIG. 5.

The following will now describe the spatio-temporal cross-covariance transformer and then feature encoder 108, entropy model 112, and feature decoder 110 in more detail.

Spatio-Temporal Cross-Covariance Transformer

Figure 2:
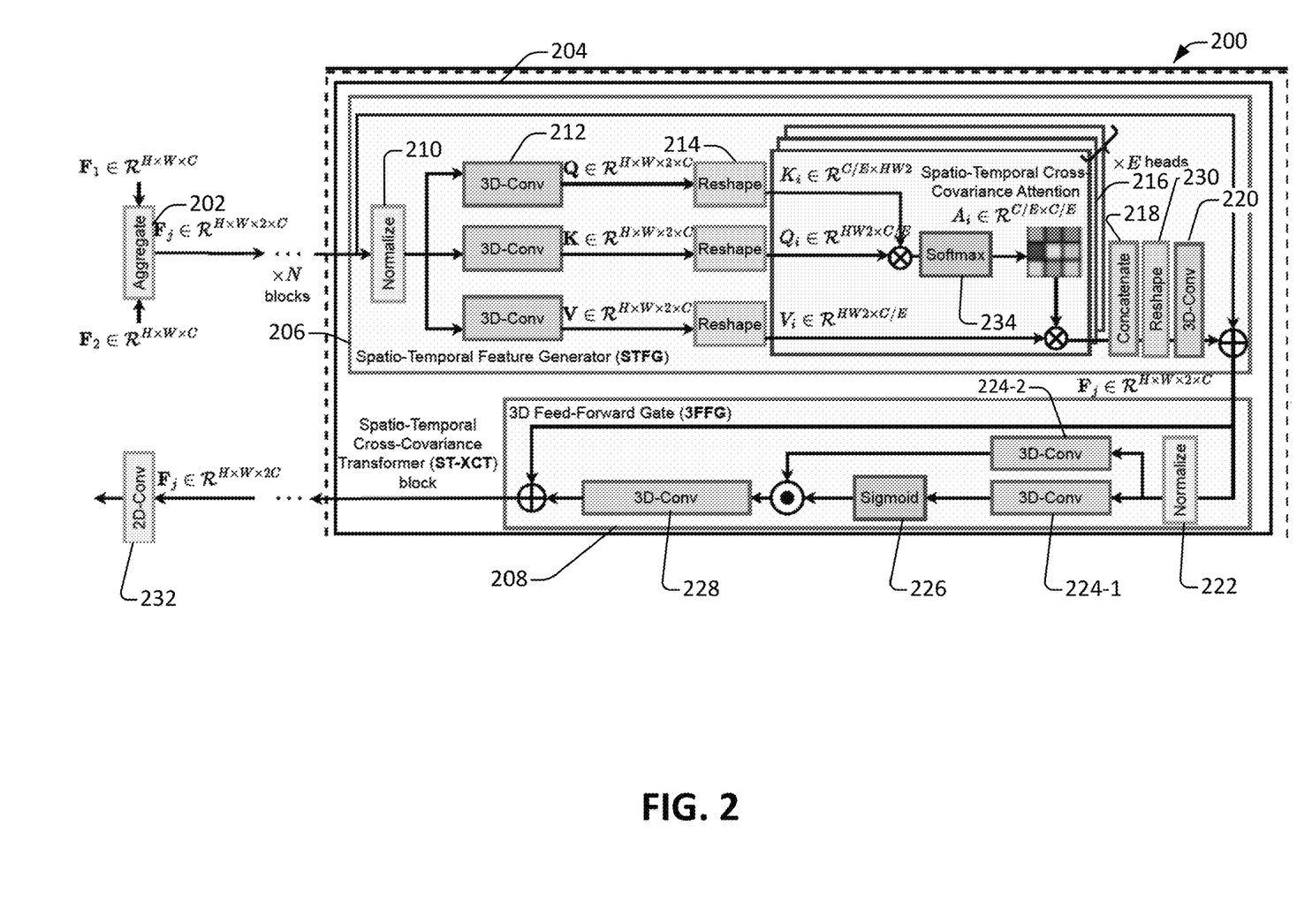
FIG. 2 depicts an example of spatio-temporal cross-covariance transformer according to some embodiments.

FIG. 2 depicts an example of spatio-temporal cross-covariance transformer 200 according to some embodiments. Uniquely, transformer 200 may be a universal module that can be integrated into multiple components of system 100, such as feature encoder 108, entropy model 112, and feature decoder 110. Transformer 200 may be used in different combinations of the three components, such as all three, two of them, or only one of them. As will be described in more detail below in FIGS. 3 to 5, transformer 200 may receive different inputs while being used in feature encoder 108, entropy model 112, and feature decoder 110, and produce different outputs. Transformer 200 may fuse the two inputs using attention that is spatially and temporally aware.

Transformer 200 may produce joint spatio-temporal features by mixing two input features spatially and temporally. An aggregate process 202 receives two individual two-dimensional (2D) features $F_1 \in R^{H \times W \times C}$ and $F_2 \in R^{H \times W \times C}$ as inputs. The variables H, W, C, respectively, represent height, width, and the number of channels. A channel may represent a characteristic of the video feature. The height may be the height of the video frame and the width may be the width of the video frame. Aggregate process 202 aggregates the two features by creating an additional temporal channel (e.g., "2" for two frames) in addition to the spatial channel. Then, aggregate process 202 produces a three-dimensional (3D) based joint features $F_j \in R^{H \times W \times 2 \times C}$ from the two inputs.

The joint features are then fused by several transformer blocks 204. Each transformer block 204 may include a spatial temporal feature generator (STFG) 206, and a 3D feed-forward gate (3FFG) 208. These two blocks may fuse the joint feature, which may combine elements of the spatial and temporal information into a representation for the spatio-temporal information.

In transformer 200, a number N blocks of spatio-temporal feature generator 206 may receive the 3D-based joint features $F_j \in R^{H \times W \times 2 \times C}$. In a spatio-temporal feature generator

206, a normalize process 210 may normalize the 3D-based joint feature. Then, 3D-convolutional layers 212 may operate on the channel dimension to mix spatial and temporal information locally. In some embodiments, 3D convolutional layers may include 1×1×1, and then 3×3×3 kernels to mix the spatial and temporal information. The convolutional layers may generate 3D-based features, such as Query (Q), Key (K), and Value (V) features. The query (Q) features may be features that may be used to determine the relevance of key features. The key (K) features may be important features of the spatial information and temporal information. The value (V) features may be the values for the joint features $F_j \in R^{H \times W \times 2 \times C}$. The query, key, and value features may be reshaped using reshape processes 214 to $Q \in R^{HW2 \times C}$, $K \in R^{C \times HW2}$, and $V \in R^{HW2 \times C}$. Reshape process 214 reshapes features from 3 dimensions (note the spatial dimension H×W is 1 dimension) to 2 dimensions. Specifically, reshape processes 214 respectively reshape the Q, K and V features with the shape of H×W×2×C to $Q \in R^{HW2 \times C}$, $K \in R^{C \times HW2}$, and $V \in R^{HW2 \times C}$.

A multi-head attention mechanism 216 may be used to apply attention to the features. For example, multi-head attention mechanism 216 may partition the query, key, and value features into E heads along the feature channel dimension to obtain $Q_i \in R^{HW2 \times C/E}$, $K_g \in R^{C/E \times HW2}$ and $V_i \in R^{HW2 \times C/E}$ for each head i. The partitioned query and key features may be combined in a dot product operation and also a softmax operation 234 to generate a spatial-temporal-aware cross-covariance attention matrix $A_i \in R^{C/E \times C/E}$. The attention matrix may represent the importance of different features and determine how much attention should be given to each feature. The query and key may be compared and the relevance is quantified as a score that may be transformed into attention weights using softmax function 234. The attention weight may represent the importance assigned to each key value in relation to a query value. The matrix may include attention weights at positions, where the weights may be temporally and spatially aware across the spatial and temporal features at respective positions of the value feature. The matrix is based on spatio-temporal correlation by transposing both spatial and temporal dimensions from a 3D-based feature to generate a spatio-temporal-aware cross-covariance matrix.

The value $V_i \in R^{HW2 \times C/E}$ may be combined, such as multiplied, with the attention weights of the attention matrix $A_i \in R^{C/E \times C/E}$ to apply attention to the value features. The attention may apply greater weight to value features that are considered more relevant and less weight to value features that are considered less relevant. Then, a concatenate process 218, reshape process 230, and 3D convolutional layer 220 may reshape and concatenate all produced features from all E heads 216 to generate $F_p \in R^{H \times W \times 2 \times C}$. Reshape process 230 may reshape the joint features from 2 dimensions (HW2×C) to back 3 dimensions (H×W×2×C) for subsequent 3D conv operation 220. Convolution layer 220 may perform 3D convolution. In some embodiments, a 3D convolutional operation is applied with 1×1×1 kernel and the same number of output channels as C (e.g., input channel). Then, $F_p \in R^{H \times W \times 2 \times C}$ is added back to the input joint features $F_j \in R^{H \times W \times 2 \times C}$ to generate joint features $F_j \in R^{H \times W \times 2 \times C}$ that includes fused spatio-temporally features. The resulting joint features $F_j \in R^{H \times W \times 2 \times C}$ is output to 3D feed-forward gate 208.

3D feed-forward gate 208 may apply a gating mechanism that may selectively allow or inhibit the information to pass through. In the process, a normalize process 222 may normalize the joint features $F_j \in R^{H \times W \times 2 \times C}$. Then, 3D convolutional layers 224-1 and 224-2 may generate two separate features. Both convolution layers 224-1 and 224-2 apply two 3D convolutional layers for each branch, in which a 1×1×1 3D convolutional layer is applied with the number of output channels as FFG_factor*C. Then, a 3×3×3 3D convolutional layer is applied with the number of output channels as C. The FFG_factor might be set differently for different coding modules. One of the features that is output by 3D convolution layer 224-1 is transformed by a sigmoid activation function 226 to serve as a "gate". The gate may determine how much of the information is incorporated or combined with the original input. For example, the output of sigmoid activation function 226 is combined with the other features output by 3D convolutional process 224-2, such as by element-wise multiplication, to filter information from the input signal.

Lastly, the fused features are fed into a 3D convolutional layer 228 and added back to the joint features $F_j \in R^{H \times W \times 2 \times C}$ that was input into 3D feed-forward gate 208. The output of 3D feed-forward gate 208 produces joint spatio-temporal features by exploiting global spatio-temporal correlation using a cross-covariant attention mechanism. 3D feed-forward gate 208 may concentrate on better information transformation by exploring the correlation between spatial-temporal neighboring pixel positions using 3D convolutional operations. The attention weights that were applied to the value features allow 3D feed-forward gate 208 to concentrate on information that is considered more relevant as combined spatial and temporal features that are considered more relevant are weighted higher. The two channels "2×C" have been combined into the joint spatio-temporal information as noted by "2C". The joint features are fed into a 2D convolution layer 232 to generate the final 2D joint features $F_j \in R^{H \times W \times C}$. The convolution layer may use a convolution network that extracts the spatial and temporal information from the 3D features to generate 2D features that represent the spatio-temporal information.

The following will now describe feature encoder 108, entropy model 112, and feature decoder 110 in more detail. As mentioned above, transformer 200 may be included in these components.

Feature Encoder

Figure 3:
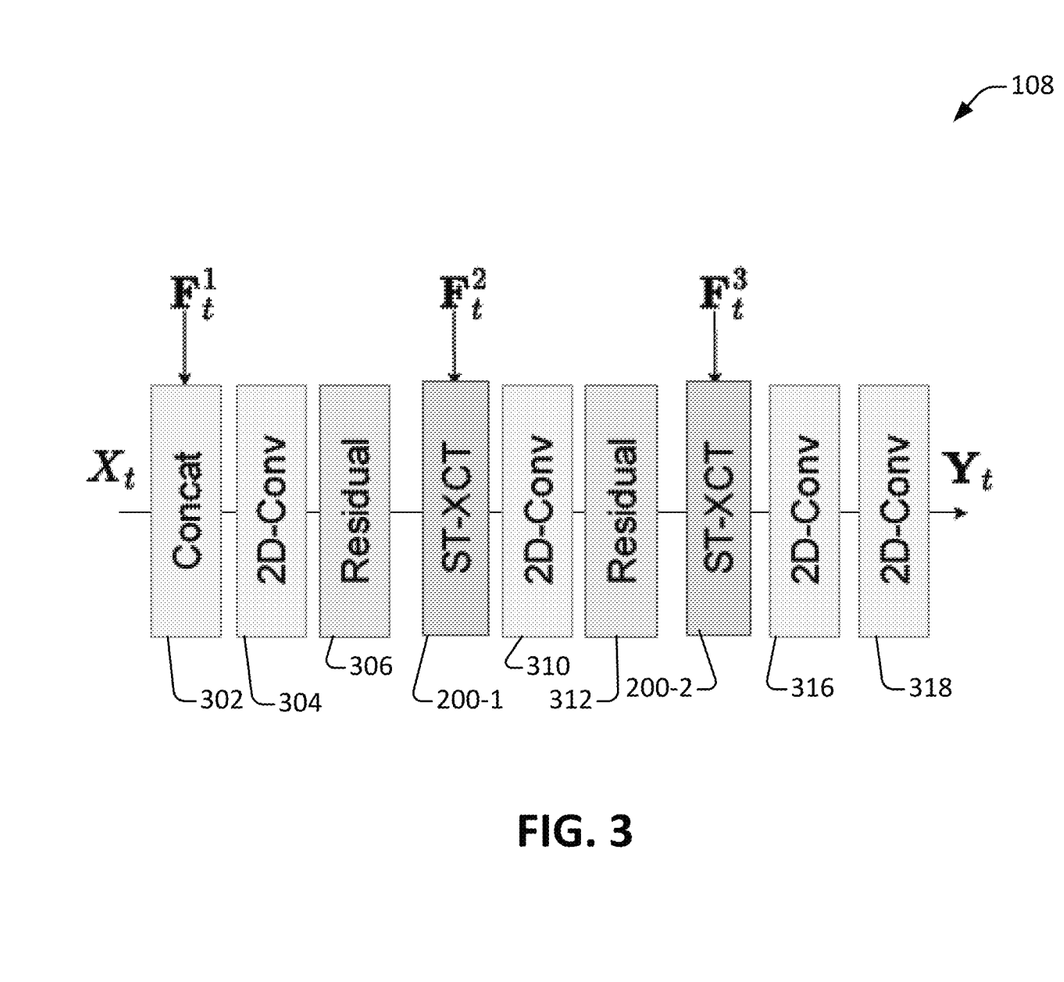
FIG. 3 depicts a more detailed example of a feature encoder according to some embodiments.

FIG. 3 depicts a more detailed example of feature encoder 108 according to some embodiments. Although the following structure is described for feature encoder 108, other structures may be appreciated. Feature encoder 108 includes multiple instances of transformer 200 that are noted as transformer 200-1 and transformer 200-2, but different numbers of transformers 200 may be used, such as one, three or more, etc. At a concatenation (concat) process 302, feature encoder 108 receives the current frame $X_t$ in addition to a first scale of a first temporal features $F_t^1$, which may be the largest scale temporal feature. Concatenation between the largest scale temporal features $F_t^1$ and the spatial information from the current frame is performed. A 2D convolutional layer 304 is performed and a residual of the output is determined. 2D convolutional layer 304 may extract features and capture local spatial patterns from the frame. Residual layer 306 may provide residual connections, which may preserve low-level details as information propagates through feature encoder 108.

Transformer 200-1 may receive the residual from the current frame $X_t$ and a second scale temporal feature, such as the mid-scale temporal features $F_t^2$. Transformer 200-1 may fuse the mid-scale temporal features $F_t^2$ with the spatio-temporal features from the residual. A 2D convolutional layer 310 and residual layer 312 process the combined features. A second transformer at 200-2 receive residual of the combined features and a third scale temporal features, such as the smallest scale temporal features $F_t^3$. Transformer 200-2 fuses the temporal features with the already combined spatio-temporal features from the residual. The output of transformer 200-2 is processed using 2 D convolutional layer 316 and 2 D convolutional layer 318 to output the latent features $Y_t$.

The use of transformer 200-1 and transformer 200-2 may improve the generation of spatio-temporal latent features $Y_t$ that are extracted. For example, using the spatial-temporal-aware cross-covariance attention matrix allows feature encoder to fuse the mid-scale and smallest scale temporal features with the spatial features where the more relevant features are given more weight to generate the latent features. Although transformer 200 is shown as combining mid-scale temporal features and the smallest-scale temporal features, transformer 200 may also be used differently in feature encoder 108, such as a transformer 200 may be used to combine the largest scale temporal features with the current frame instead of using concatenation.

Entropy Model

Figure 4:
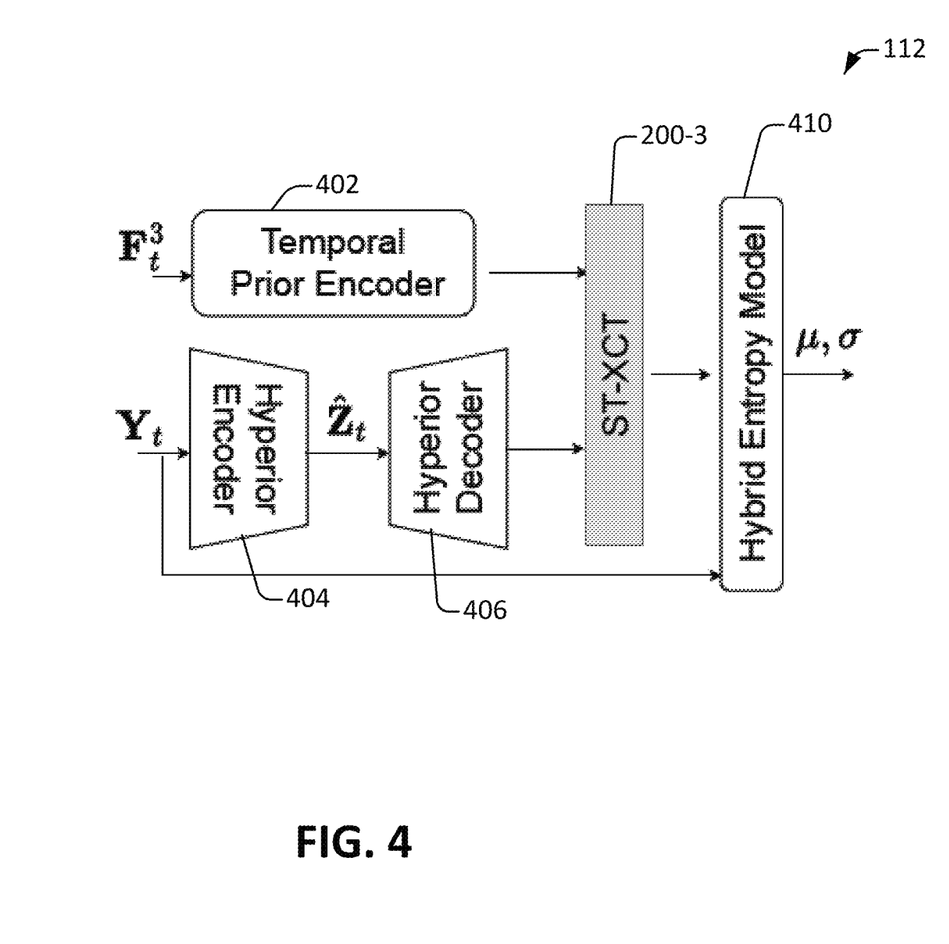
FIG. 4 depicts an example of an entropy model according to some embodiments.

FIG. 4 depicts an example of entropy model 112 according to some embodiments. Although the following structure is described for entropy model 112, other structures may be appreciated. Entropy model 112 may use a transformer 200-3 in place of concatenation when entropy coding is performed.

A temporal prior encoder 402 receives a scale of temporal features, such as the smallest scale temporal features $F_t^3$, and generates a temporal prior. A temporal prior may capture temporal dependencies and patterns using the smallest scale temporal features $F_t^3$. A hyperprior encoder 404 receives the latent features $Y_t$ and generates quantized features $\hat{Z}_t$. Then, a hyperprior decoder 406 generates a decoded spatio-temporal prior feature. Hyperprior encoder 404 and hyperprior decoder 406 may operate on higher order modeling or higher level statistics.

Transformer 200-3 receives the temporal prior and decoded spatio-temporal prior feature, and fuses the temporal prior and decoded spatio-temporal prior feature to generate a better spatio-temporal prior. In some embodiments, 16 transformer blocks and 6-heads for each cross-covariance attention mechanism are used to fuse the temporal prior and decoded spatio-temporal prior feature. Then, the spatio-temporal prior that is outputted by transformer 200-3 may be entropy encoded using hybrid entropy model 410 to estimate the distribution, such as a mean and standard deviation, of the spatio-temporal prior.

The use of transformer 200-3 may improve the generation of the spatio-temporal prior that is used in entropy coding. For example, using the spatial-temporal-aware cross-covariance attention matrix allows entropy model to fuse the smallest scale temporal features with the latent features where the more relevant features are given more weight to generate the spatio-temporal prior, which yields more relevant results than concatenation.

Frame Reconstruction

Figure 5:
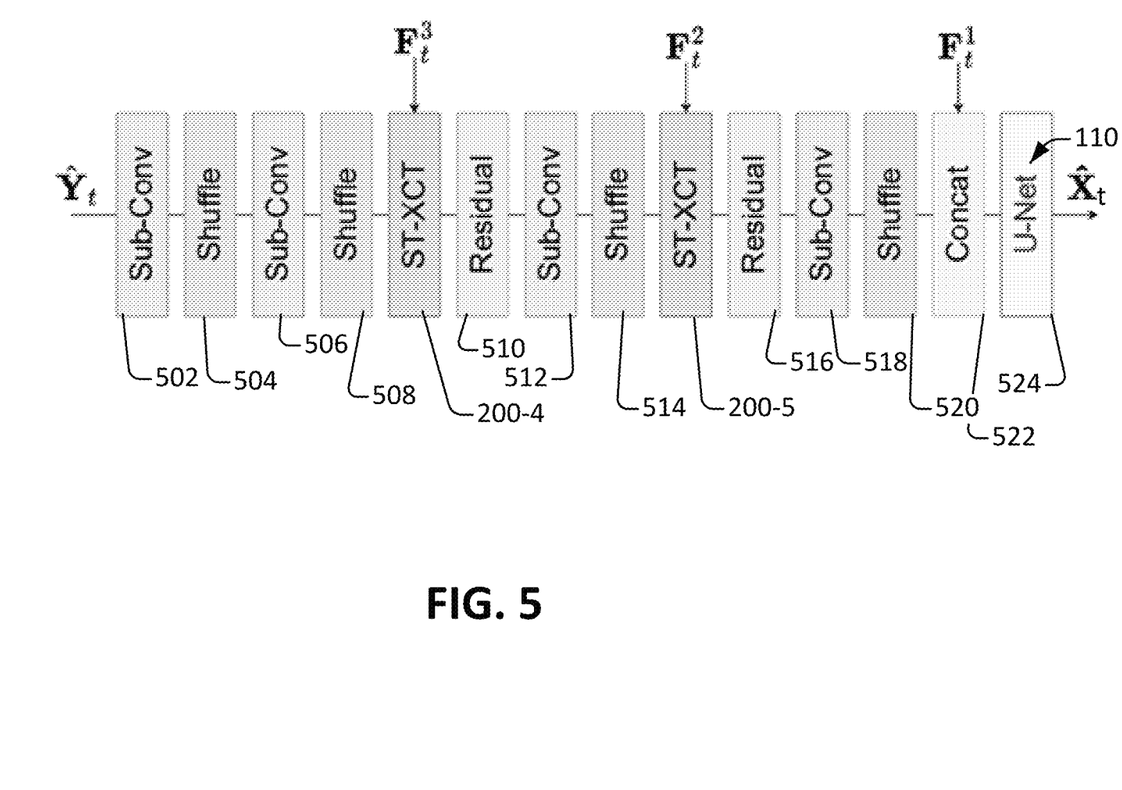
FIG. 5 depicts an example of a feature decoder according to some embodiments.

FIG. 5 depicts an example of feature decoder 110 according to some embodiments. Although the structure is described for feature decoder 110, other structures may be appreciated. Transformers 200-4 and 200-5 are used in this example, but other numbers of transformers 200 may be used, such as one, three or more, etc. In the process, feature decoder 110 receives the quantized latent features $\hat{Y}_t$, which is processed by a sub-convolutional layer 502, a shuffle layer 504, a sub-convolutional layer 506, and a shuffle layer 508. Sub-convolutional layer 502 and sub-convolutional layer 506 may use a kernel size and a stride of convolutional layers to extract local features of the quantized latent features $\hat{Y}_t$. Shuffle layer 504 and shuffle layer 508 may randomly re-order elements.

The output of shuffle layer 508 is a representation of the quantized latent features $\hat{Y}_t$, which is input into a transformer 200-4 along with a first scale of temporal features, such as the smallest scale temporal features $F_t^3$. Transformer 200-4 may fuse the smallest scale temporal features $F_t^3$ with the extracted local features of the quantized latent features $\hat{Y}_t$. In some embodiments, transformer 200-4 may include six transformer blocks with two heads for attention mechanisms. The output of transformer 200-4 is processed by a residual block 510, a sub-convolutional layer 512, and a shuffle layer 514. Residual block may preserve important information. Sub-convolutional layer 512 operates similarly to sub-convolution layer 504 and/or 506 and shuffle layer 514 operates similarly to shuffle layers 504 and/or 508.

The output of shuffle layer 514 is input into a transformer 200-5 along with a second scale of temporal features, such as the mid-scale temporal features $F_t^2$. In some embodiments, transformer 200-5 may include four transformer blocks and two heads for attention mechanisms.

The output of transformer 200-5 may be processed by a residual block 516, a convolutional layer 518, a shuffle layer 520. Residual block 516 may operate similarly to residual block 510. Sub-convolutional layer 518 may operate similarly to sub-convolution layers 502, 506, and/or 512. Shuffle layer 520 may operate similarly to the other shuffle layers.

A concatenation layer 522 receives the output of shuffle layer 520 and a third scale of temporal features, such as the largest scale temporal features $F_t^1$. Concatenation layer 522 concatenates the largest scale temporal features with the output of shuffle layer 520. The concatenated features are processed by a UNet layer 524 to generate the reconstructed frame $\hat{X}_t$. UNet layer 524 may be a convolutional neural network architecture that includes an encoder path and a decoder path that allows for the extraction of high level features and the generation of the reconstructed frame $\hat{X}_t$.

The use of transformer 200-4 and transformer 200-5 may improve the reconstruction of the original video frame by using spatio-temporal features that are more relevant. For example, using the spatial-temporal-aware cross-covariance attention matrix allows feature decoder 110 to fuse the smallest-scale and mid-scale temporal features with the spatio-temporal features where the more relevant features are given more weight to generate the reconstructed frame. Transformer 200 may also be used differently in feature decoder 110, such as a transformer 200 may be used to combine the largest scale temporal features with the current frame.

Method Flow

Figure 6:
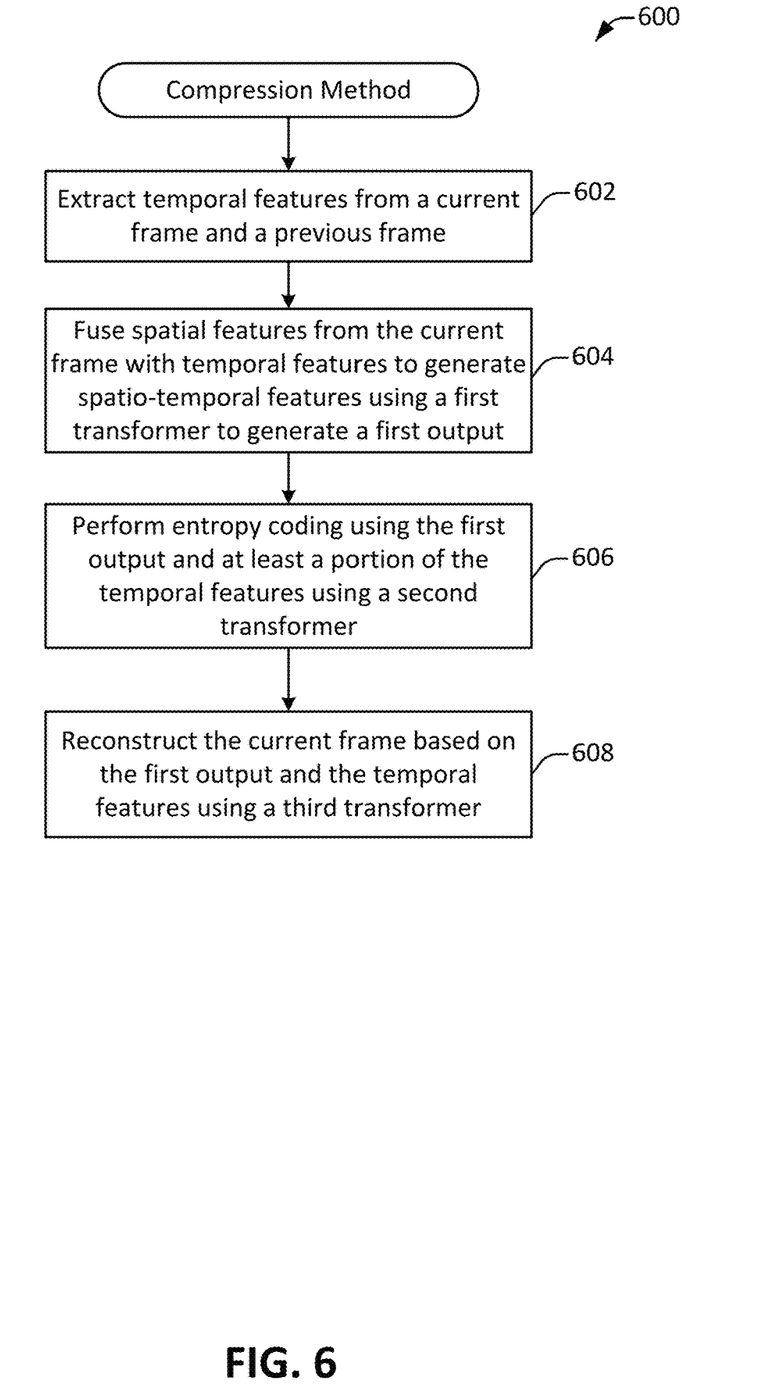
FIG. 6 depicts a simplified flowchart of a method for performing compression according to some embodiments.

FIG. 6 depicts a simplified flowchart 600 of a method for performing compression according to some embodiments. At 602, temporal context mining process 106 extract temporal features from a current frame and a previous frame. The output may be the multi-scale temporal features $F_t^1$, $F_t^2$, $F_t^3$.

At 604, feature encoder 108 fuses spatial features from the current frame with the multi-scale temporal features $F_t^1$, $F_t^2$, $F_t^3$ to generate spatio-temporal features using a first transformer. Feature encoder 108 may generate a first output of latent features $Y_t$ with the spatial-temporal features.

At 606, entropy model 112 performs entropy coding using the first output and at least a portion of the temporal features using a second transformer. For example, entropy model 112 receives the latent features $Y_t$ with the spatial-temporal features and the smallest scale temporal features $F_t^3$. Entropy model 112 outputs a second output of a distribution.

At 608, feature decoder 110 reconstructs the current frame based on the first output and the multi-scale temporal features $F_t^1$, $F_t^2$, $F_t^3$ using a third transformer. For example, feature decoder 110 may receive the quantized latent features $\hat{Y}_t$ that is generated using the second output from entropy model 112 along with the multi-scale temporal features $F_t^1$, $F_t^2$, $F_t^3$. The output may be the reconstructed current frame.

CONCLUSION

Figure 7:
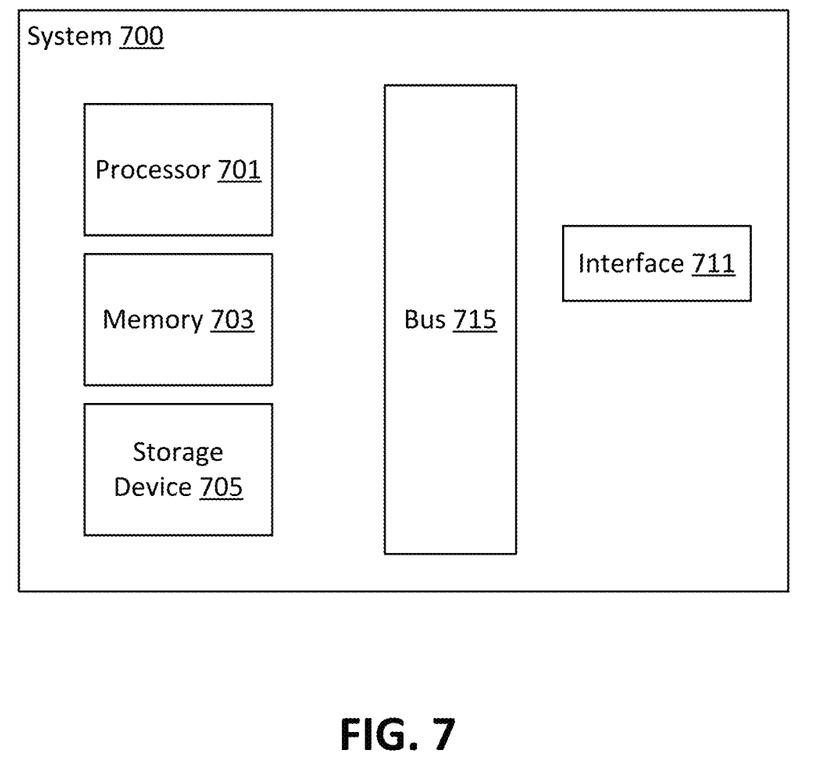
FIG. 7 illustrates one example of a computing device.

Using transformer 200 in different components of the compression process may improve the bitrate compression. That is, fewer bits may be used in the resulting compressed bitstream. Also, the decoded bitstream may retain more information from the original video frames when reconstructed using transformers 200. For example, a higher level of detail may be reconstructed due to the spatial and temporal features that were extracted. In some examples, system 100 may recover more structural information in objects from the video that simple concatenation cannot achieve. Further, system 100 may avoid the introduction of some artifacts. Performance improvements and compression result from using transformer 200 in spatio-temporal feature encoding, entropy modeling, and frame reconstruction. Transformer 200 may extract multi-scale spatio-temporal features in an improved manner. Further, transformer 200 may efficiently exploit spatio-temporal correlation to benefit entropy coding. Finally, transformer 200 may provide spatio-temporal features that retain the structure from the original frame. System FIG. 7 illustrates one example of a computing device. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as a variety of devices such as system 100, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. Storage device 705 may include a non-transitory computer-readable storage medium holding information, instructions, or some combination thereof, for example instructions that when executed by the processor 701, cause processor 701 to be configured or operable to perform one or more operations of a method as described herein. Bus 715 or other communication components may support communication of information within system 700. The interface 711 may be connected to bus 715 and be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a," "an," and "the" include plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A system comprising:
a first component to extract temporal features from a current frame being coded and a previous frame of a video, wherein three-dimensional based joint features are determined using the temporal features and spatial features from the current frame;
a second component that uses a first transformer to receive the three-dimensional based joint features as input and fuse the spatial features from the current frame with the temporal features to generate spatio-temporal features as first output;
a third component that uses a second transformer to perform entropy coding using the first output and at least a portion of the temporal features to generate a second output, wherein the second transformer is used to fuse the spatio-temporal features with the at least a portion of the temporal features to output fused spatio-temporal features that are entropy encoded to generate the second output; and
a fourth component that uses a third transformer to reconstruct the current frame, wherein the first output is processed using the second output to generate third output, and wherein the third transformer fuses the temporal features with the third output.

2. The system of claim 1, wherein the three-dimensional based joint features are:
joint features for a first feature from a first input and a second feature from a second input are generated, wherein the joint features include a temporal channel.

3. The system of claim 2, wherein at least one of the first transformer, the second transformer and the third transformer:
generates a matrix of attention weights based on the joint features; and
applies the attention weights to the joint features.

4. The system of claim 3, wherein at least one of the first transformer, the second transformer and the third transformer:
generates a query feature, a key feature, and a value feature from the joint features; and
generates the matrix of attention weights based on the key feature and the value feature; and
applies the attention weights to the value feature.

5. The system of claim 4, wherein the attention weights are generated by:
combining the query feature and the key feature to generate a combined output; and
applying a function to the combined output to generate the matrix for the attention weights.

6. The system of claim 5, wherein at least one of the first transformer, the second transformer and the third transformer:
applies the attention weights to the value feature to generate a product feature.

7. The system of claim 6, wherein at least one of the first transformer, the second transformer and the third transformer:
combines the product feature with the joint features to generate updated joint features.

8. The system of claim 7, wherein at least one of the first transformer, the second transformer and the third transformer:
applies a gating mechanism on the updated joint features to filter information from the updated joint features to generate a gated joint spatio-temporal features.

9. The system of claim 8, wherein at least one of the first transformer, the second transformer and the third transformer:
generates a two dimensional spatio-temporal feature from the gated joint spatio-temporal features.

10. The system of claim 1, wherein the second component:
receives spatial information from the current frame;
combines the spatial information with a first scale of the temporal features to generate first joint spatio-temporal features;
combines, using the first transformer, the first joint spatio-temporal features with a second scale of the temporal features to generate second joint spatio-temporal features; and
combines, using the first transformer, the second joint spatio-temporal features with a third scale of the temporal features to generate third joint spatio-temporal features.

11. The system of claim 10, wherein the third joint spatio-temporal features are used to generate an encoded bitstream of the current frame.

12. The system of claim 1, wherein the third component:
receives a first scale of the temporal features;
receives the first output from the second component;
combines the first scale of the temporal features and the first output using the second transformer to generate a spatio-temporal prior; and
entropy codes the spatio-temporal prior to generate a distribution.

13. The system of claim 12, wherein the distribution is used to encode the first output to an encoded bitstream and decode the encoded bitstream.

14. The system of claim 1, wherein the fourth component:
receives the first output that is processed using the second output;
combines the first output that is processed using the second output with a first scale of the temporal features to generate first joint spatio-temporal features;
combines, using the third transformer, the first joint spatio-temporal features with a second scale of the temporal features to generate second joint spatio-temporal features; and
combines, using the third transformer, the second joint spatio-temporal features with a third scale of the temporal features to generate third joint spatio-temporal features, wherein the third joint spatio-temporal features are used to reconstruct the current frame.

15. A method comprising:
extracting temporal features from a current frame being coded and a previous frame of a video, wherein three-dimensional based joint features are determined using the temporal features and spatial features from the current frame;
using a first transformer to receive the three-dimensional based joint features as input and fuse the spatial features from the current frame with the temporal features to generate spatio-temporal features as first output;
using a second transformer to perform entropy coding using the first output and at least a portion of the temporal features to generate a second output, wherein the second transformer is used to fuse the spatio-temporal features with the at least a portion of the temporal features to output fused spatio-temporal features that are entropy encoded to generate the second output; and using a third transformer to reconstruct the current frame, wherein the first output is processed using the second output to generate a third output, and wherein the third transformer fuses the temporal features with the third output.

16. The method of claim 15, further comprising:
receiving a first input of a first feature and a second input of a second feature; and
generating joint feature for the first feature and the second feature, wherein the joint features include a temporal channel.

17. The method of claim 16, wherein at least one of the first transformer, the second transformer and the third transformer:
generates a matrix of attention weights based on the joint features; and
applies the attention weights to the joint features.

18. The method of claim 17, wherein at least one of the first transformer, the second transformer and the third transformer:
generates a query feature, a key feature, and a value feature from the joint spatio features; and
generates the matrix of attention weights based on the key feature and the value feature; and
applies the attention weights to the value feature.

19. The method of claim 18, wherein the attention weights are generated by:
combining the query feature and the key feature to generate a combined output; and applying a function to the combined output to generate the matrix for the attention weights.

20. An apparatus comprising:
one or more computer processors; and
a computer-readable storage medium comprising instructions for controlling the one or more computer processors to be operable for:
extracting temporal features from a current frame being coded and a previous frame of a video, wherein three-dimensional based joint features are determined using the temporal features and spatial features from the current frame;
using a first transformer to receive the three-dimensional based joint features as input and fuse the spatial features from the current frame with the temporal features to generate spatio-temporal features as first output;
using a second transformer to perform entropy coding using the first output and at least a portion of the temporal features to generate a second output, wherein the second transformer is used to fuse the spatio-temporal features with the at least a portion of the temporal features to output fused spatio-temporal features that are entropy encoded to generate the second output; and
using a third transformer to reconstruct the current frame, wherein the first output is processed using the second output to generate a third output and wherein the third transformer fuses the temporal features with the third output.

* * * * *

UNITED STATES PATENT AND TRADEMARK OFFICE
CERTIFICATE OF CORRECTION

PATENT NO. : 12,309,404 B2
APPLICATION NO. : 18/349076
DATED : May 20, 2025
INVENTOR(S) : Zhenghao Chen It is certified that error appears in the above-identified patent and that said Letters Patent is hereby corrected as shown below:

In the Claims

In Claim 18, Column 13, Line 23, after "joint" delete "spatio"

Signed and Sealed this
Fifteenth Day of July, 2025

Coke Morgan Stewart
*Acting Director of the United States Patent and Trademark Office*